(12) United States Patent
Dighrasker et al.

(10) Patent No.: US 8,878,389 B2
(45) Date of Patent: Nov. 4, 2014

(54) METHOD AND APPARATUS FOR PROVIDING UNINTERRUPTIBLE POWER

(75) Inventors: Milind Dighrasker, Karnataka (IN); Damir Klikic, Waltham, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 588 days.

(21) Appl. No.: 13/004,513

(22) Filed: Jan. 11, 2011

(65) Prior Publication Data
US 2012/0175958 A1    Jul. 12, 2012

(51) Int. Cl.
 *H02J 7/00*  (2006.01)
 *H02J 9/00*  (2006.01)
 *H02M 3/158*  (2006.01)
 *H02J 9/06*  (2006.01)

(52) U.S. Cl.
 CPC ............. *H02M 3/1582* (2013.01); *H02J 9/062* (2013.01)
 USPC .......................................................... 307/66

(58) Field of Classification Search
 USPC ..................................... 307/64, 66
 See application file for complete search history.

(56) References Cited

U.S. PATENT DOCUMENTS

| 4,564,767 A | 1/1986 | Charych |
| 4,673,826 A | 6/1987 | Masson |
| 4,683,529 A | 7/1987 | Bucher, II |
| 4,816,982 A | 3/1989 | Severinsky |
| 4,823,247 A | 4/1989 | Tamoto |
| 4,827,151 A | 5/1989 | Okado |
| 4,831,508 A | 5/1989 | Hunter |
| 4,937,505 A | 6/1990 | Deglon et al. |
| 4,964,029 A | 10/1990 | Severinsky et al. |

(Continued)

FOREIGN PATENT DOCUMENTS

| CN | 2202371 Y | 6/1995 |
| CN | 2729995 Y | 9/2005 |

OTHER PUBLICATIONS

David M. Xu et al., Quasi Soft-Switching Partly Decoupled Three-Phase PFC with Approximate Unity Power Factor, 1998, pp. 953-957.

(Continued)

*Primary Examiner* — Jared Fureman
*Assistant Examiner* — Rasem Mourad
(74) *Attorney, Agent, or Firm* — Lando & Anastasi, LLP (57) ABSTRACT

At least one aspect of the invention is directed to an uninterruptible power supply. The uninterruptible power supply includes a first input having an input line connection and an input neutral connection to receive a first input voltage from a first voltage source, a second input having a positive input connection and a negative input connection to receive a second input voltage from a second voltage source, a boost circuit configured to provide a positive output DC voltage with respect to the input neutral connection and a negative output DC voltage with respect to the input neutral connection in both a line mode of operation and a backup mode of operation, a first connection circuit configured to couple the first input to the boost circuit in the line mode of operation, and configured to couple the second input to the boost circuit in the backup mode of operation, and a second connection circuit configured to couple a midpoint of the boost circuit to the input neutral connection in the line mode of operation and to couple the midpoint of the boost circuit to the positive input connection in battery mode of operation.

19 Claims, 9 Drawing Sheets

(56) References Cited

U.S. PATENT DOCUMENTS

| | | |
|---|---|---|
| 4,980,812 A | 12/1990 | Johnson, Jr. et al. |
| 5,017,800 A | 5/1991 | Divan |
| 5,047,913 A | 9/1991 | De Doncker et al. |
| 5,126,585 A | 6/1992 | Boys |
| 5,184,025 A | 2/1993 | McCurry et al. |
| 5,519,306 A | 5/1996 | Itoh et al. |
| 5,602,462 A | 2/1997 | Stich et al. |
| 5,654,591 A | 8/1997 | Mabboux et al. |
| 5,684,686 A | 11/1997 | Reddy |
| 5,923,103 A | 7/1999 | Pulizzi et al. |
| 5,968,398 A | 10/1999 | Schmitt et al. |
| 5,982,652 A | 11/1999 | Simonelli et al. |
| 6,046,920 A | 4/2000 | Cazabat et al. |
| 6,069,412 A | 5/2000 | Raddi et al. |
| 6,191,500 B1 | 2/2001 | Toy |
| 6,201,371 B1 | 3/2001 | Kawabe et al. |
| 6,215,287 B1 | 4/2001 | Matsushiro et al. |
| 6,330,176 B1 | 12/2001 | Thrap et al. |
| 6,400,591 B2 | 6/2002 | Reilly et al. |
| 6,483,730 B2 | 11/2002 | Johnson, Jr. |
| 6,639,383 B2 | 10/2003 | Nelson et al. |
| 6,661,678 B2 * | 12/2003 | Raddi et al. ............... 363/37 |
| 6,728,119 B2 | 4/2004 | Reilly et al. |
| 6,737,840 B2 | 5/2004 | McDonald et al. |
| 6,757,185 B2 | 6/2004 | Rojas Romero |
| 6,838,925 B1 | 1/2005 | Nielsen |
| 6,850,426 B2 | 2/2005 | Kojori et al. |
| 6,853,097 B2 * | 2/2005 | Matsuda et al. ............ 307/66 |
| 6,853,564 B2 | 2/2005 | Kravitz |
| 6,944,035 B2 | 9/2005 | Raddi et al. |
| 7,005,759 B2 | 2/2006 | Ying et al. |
| 7,012,825 B2 | 3/2006 | Nielsen |
| 7,091,625 B2 | 8/2006 | Okusawa et al. |
| 7,126,409 B2 | 10/2006 | Nielsen |
| 7,239,043 B2 | 7/2007 | Taimela et al. |
| 7,274,112 B2 | 9/2007 | Hjort et al. |
| 7,402,921 B2 | 7/2008 | Ingemi et al. |
| 7,652,393 B2 | 1/2010 | Moth |
| 7,705,489 B2 | 4/2010 | Nielsen et al. |
| 8,143,744 B2 | 3/2012 | Nielsen et al. |
| 8,228,046 B2 * | 7/2012 | Ingemi et al. ............... 323/222 |
| 8,305,779 B2 * | 11/2012 | Lu et al. .................... 363/37 |
| 2002/0130648 A1 | 9/2002 | Raddi et al. |
| 2002/0191425 A1 | 12/2002 | Geissler |
| 2003/0048006 A1 | 3/2003 | Shelter et al. |
| 2003/0220026 A1 | 11/2003 | Oki et al. |
| 2004/0084967 A1 | 5/2004 | Nielsen |
| 2004/0155526 A1 | 8/2004 | Naden et al. |
| 2004/0160789 A1 | 8/2004 | Ying et al. |
| 2005/0036248 A1 | 2/2005 | Klikic et al. |
| 2005/0168073 A1 | 8/2005 | Hjort |
| 2005/0201127 A1 | 9/2005 | Tracy et al. |
| 2005/0275976 A1 | 12/2005 | Taimela et al. |
| 2005/0278075 A1 | 12/2005 | Rasmussen et al. |
| 2006/0043792 A1 | 3/2006 | Hjort et al. |
| 2006/0043793 A1 | 3/2006 | Hjort et al. |
| 2006/0043797 A1 | 3/2006 | Hjort et al. |
| 2006/0044846 A1 | 3/2006 | Hjort et al. |
| 2006/0072262 A1 | 4/2006 | Paik et al. |
| 2006/0238941 A1 | 10/2006 | Ingemi et al. |
| 2006/0279970 A1 | 12/2006 | Kernahan |
| 2007/0055409 A1 | 3/2007 | Rasmussen et al. |
| 2007/0064363 A1 | 3/2007 | Nielsen et al. |
| 2007/0228837 A1 | 10/2007 | Nielsen et al. |
| 2008/0042491 A1 | 2/2008 | Klikic et al. |
| 2008/0061628 A1 | 3/2008 | Nielsen et al. |
| 2008/0067872 A1 | 3/2008 | Moth |
| 2008/0157601 A1 | 7/2008 | Masciarelli et al. |
| 2008/0197706 A1 | 8/2008 | Nielsen |
| 2008/0272744 A1 | 11/2008 | Melanson |
| 2009/0039706 A1 | 2/2009 | Kotlyar et al. |
| 2009/0046415 A1 | 2/2009 | Rasmussen et al. |
| 2010/0054002 A1 | 3/2010 | Lu et al. |
| 2010/0072819 A1 | 3/2010 | Lee et al. |
| 2010/0315849 A1 * | 12/2010 | Ingemi et al. ............... 363/89 |
| 2011/0227418 A1 * | 9/2011 | Pyboyina et al. ........... 307/75 |

OTHER PUBLICATIONS

International Search Report for PCT/US2012/020732 mailed Aug. 8, 2012.

* cited by examiner

METHOD AND APPARATUS FOR PROVIDING UNINTERRUPTIBLE POWER

BACKGROUND OF THE INVENTION

1. Field of Invention

Embodiments of the invention relate generally to power supplies and more specifically, at least one embodiment relates to a method and apparatus for generating an output voltage derived from an input voltage.

2. Discussion of Related Art

Figure 1:
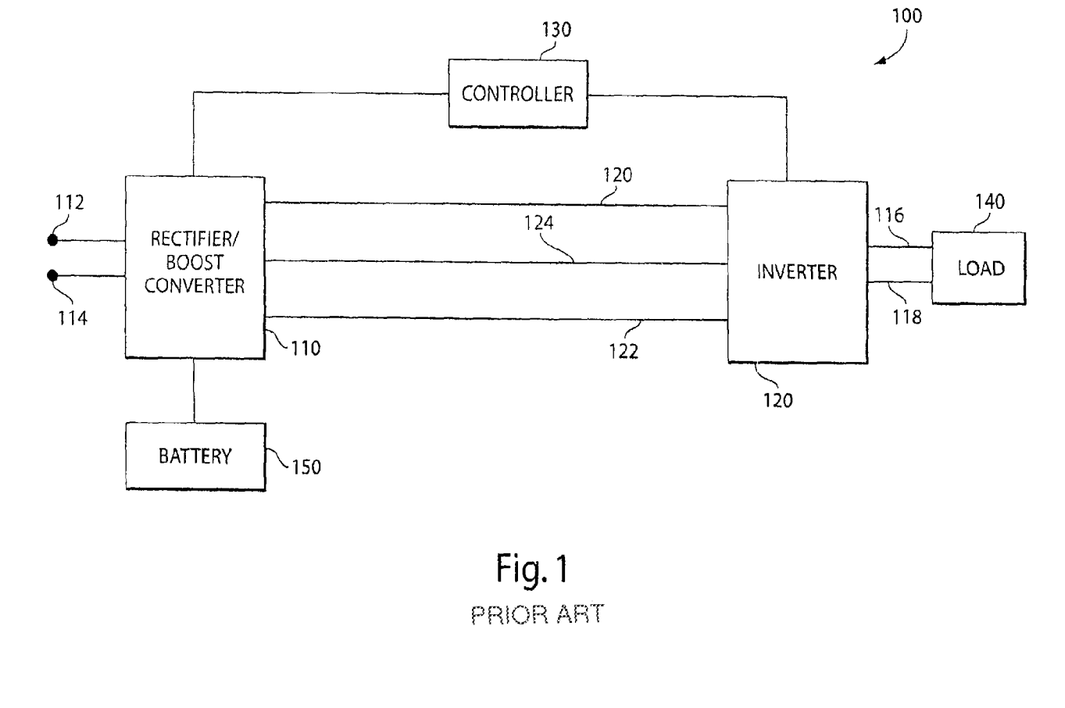
FIG. 1 is a functional block diagram of an uninterruptible power supply.

Uninterruptible power supplies (UPS) for providing power to critical loads are well known. FIG. 1 provides a block diagram of a typical on-line UPS 100 that provides regulated power as well as back-up power to a load 140. The UPS 100 includes a rectifier/boost converter 110, an inverter 120, a controller 130 and a battery 150. The UPS has inputs 112 and 114 to couple respectively to line and neutral of an input AC power source and has outputs 116 and 118 to provide an output line and neutral to the load 140.

In line mode of operation, under control of the controller, the rectifier/boost converter 110 receives the input AC voltage and provides positive and negative output DC voltages at output lines 120 and 122 with respect to a common or neutral line 124. In battery mode of operation, upon loss of input AC power, the rectifier/boost converter 110 generates the DC voltages from the battery 150. The common line 124 may be coupled to the input neutral 114 and the output neutral 118 to provide a continuous neutral through the UPS 100. The inverter 120 receives the DC voltages from the rectifier/boost converter 110 and provides an output AC voltage at lines 116 and 118.

Figure 2A:
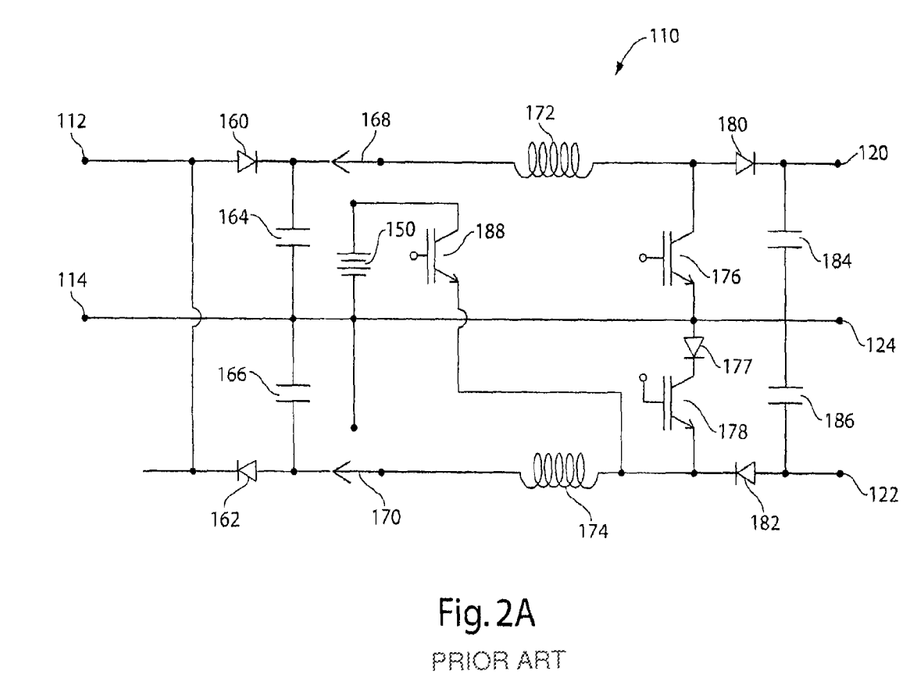
FIG. 2A is a schematic diagram of a prior art rectifier/boost converter that may be used in the uninterruptible power supply of FIG. 1 with the rectifier/boost converter in a first state of operation.
Figure 2B:
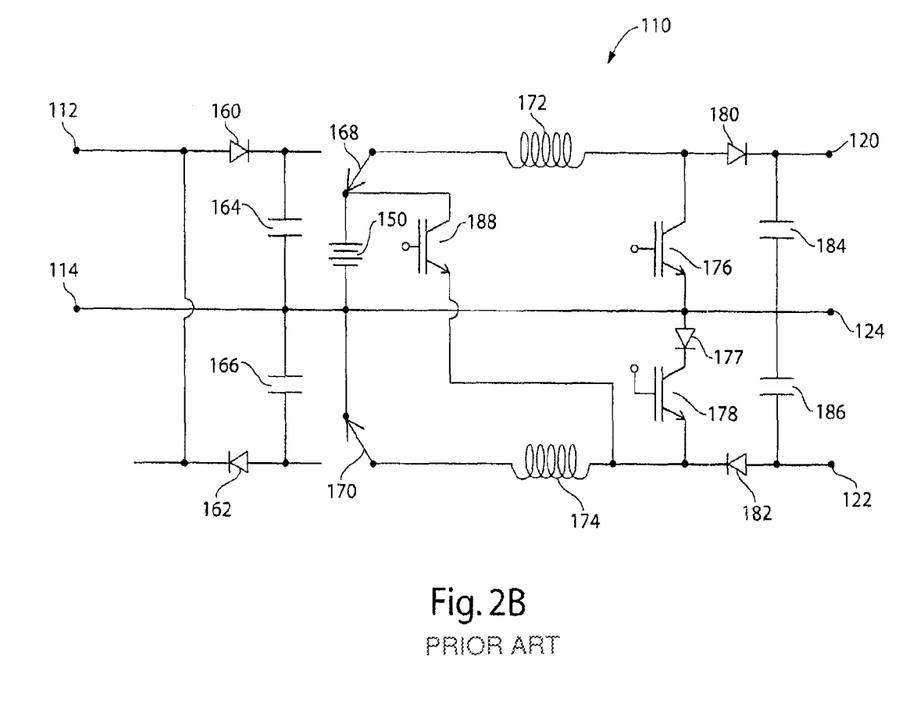
FIG. 2B is a schematic diagram of the rectifier/boost converter of FIG. 2A in a second state of operation.

Further details of the rectifier/boost converter 110 and the battery 150 are shown in FIGS. 2A and 2B with FIG. 2A showing the UPS in line mode of operation and FIG. 2B showing the UPS in battery mode of operation. The rectifier/boost converter 110 includes input diodes 160, 162, input capacitors 164, 166, relays 168 and 170, inductors 172 and 174, boost transistors 176 and 178, diode 177, output diodes 180, 182, and output capacitors 184, 186. In addition, the rectifier/boost converter includes a transistor 188 that, as described below functions as part of a buck-boost circuit in the battery mode of operation.

In line mode of operation, relays 168, 170 are configured as shown in FIG. 2A to couple an input AC line voltage at inputs 112, 114 to inductors 172 and 174, such that positive and negative rectified voltages are respectively provided to inductors 172 and 174. Inductor 172 operates in conjunction with transistor 176 and diode 180 as a positive boost circuit under the control of the controller 130 using pulse width modulation to provide a positive DC voltage across capacitor 184. Similarly, inductor 174 operates in conjunction with transistor 178 and diode 182 as a negative boost circuit under the control of the controller 130 using pulse width modulation to provide a negative DC voltage across capacitor 186. The controller may control operation of the boost circuits to provide power factor correction at the input of the uninterruptible power supply, with the input currents being sinusoidal with low total harmonic distortion and substantially in phase with the input voltage.

In battery or backup mode of operation, for example, upon failure of the AC voltage source, the relays 168, 170 are moved, under the control of the controller, to the positions shown in FIG. 2B to couple the battery 150 to inductors 172 and 174. In the battery mode of operation, the positive boost circuit operates as discussed above using the battery voltage to generate the DC voltage across capacitor 184. To generate the negative voltage across the capacitor 186 in battery mode, the transistor 188, under the control of the controller, in conjunction with inductor 174 and diode 182 functions as a buck-boost circuit with transistor 188 being cycled off and on. In one version, during each cycle, transistor 178 is turned on immediately prior to transistor 188 being turned on to reduce the voltage across transistor 188 at the time of turn-on to approximately the battery voltage. The drive signal to transistor 178 remains on for the duration of the on time of transistor 188. There is no current flow in transistor 178 due to the fact that the emitter of transistor 178 is at the battery voltage. When transistor 188 is turned off, transistor 178 is again forward biased and the inductor current flows through diode 177 and transistor 178. Transistor 178 stays on for 0.5 microseconds to allow transistor 188 to turn off totally, and is then turned off.

The UPS described above allows a single battery to be used in a dual DC bus (also referred to as a split DC bus) rectifier converter circuit. Other approaches utilize dual batteries or a split battery having a midpoint to generate the positive and negative bus voltages in battery mode of operation.

Another approach to using a single battery in a split DC bus rectifier converter circuit is described in U.S. Pat. No. 6,661,678 to Raddi et al. The Raddi patent describes approaches in which either a relay or a diode circuit is used to couple a single battery to dual DC buses in a UPS.

Still another approach to using a single battery in a split DC bus rectifier converter circuit is described in U.S. Pat. No. 7,705,489, which is incorporated herein by reference.

BRIEF SUMMARY OF THE INVENTION

At least one aspect of the invention is directed to an uninterruptible power supply. The uninterruptible power supply includes a first input having an input line connection and an input neutral connection to receive a first input voltage from a first voltage source, a second input having a positive input connection and a negative input connection to receive a second input voltage from a second voltage source, a boost circuit configured to provide a positive output DC voltage with respect to the input neutral connection and a negative output DC voltage with respect to the input neutral connection in both a line mode of operation and a backup mode of operation, a first connection circuit configured to couple the first input to the boost circuit in the line mode of operation, and configured to couple the second input to the boost circuit in the backup mode of operation, and a second connection circuit configured to couple a midpoint of the boost circuit to the input neutral connection in the line mode of operation and to couple the midpoint of the boost circuit to the positive input connection in battery mode of operation.

In the uninterruptible power supply, the second voltage source may be a battery, and the uninterruptible power supply may include the battery. The uninterruptible power supply may further include an output circuit coupled to the boost circuit to receive the positive output DC voltage and the negative output DC voltage and to provide an output AC voltage at an output having an output line connection and an output neutral connection. The uninterruptible power supply may be configured to provide an uninterrupted connection from the input neutral connection to the output neutral connection. The first connection circuit may include a first relay configured to selectively couple one end of a first boost inductor to one of the input line connection and the positive input connection, and the first connection circuit may include a second relay configured to couple one end of a second boost inductor to one of the input line connection and the negative input connection. The boost circuit may include a first switching device having a first end and a second end with the second end coupled to the negative input connection and the boost circuit may include a second switching device having a first end and a second end with the first end coupled to the midpoint of the boost circuit. The uninterruptible power supply may further include a switching circuit configured to selectively couple the second end of the second switching device to the negative input connection. The second switching device may be controlled in the backup mode of operation to periodically turn on and off and before each on and off transition of the second switching device, the switching circuit may be configured to couple the second end of the second switching device to the negative input connection. The second switching device may include a first transistor having a maximum current rating, and the switching circuit may include a second transistor having a maximum current rating that is less than the maximum current rating of the first transistor.

Another aspect of the invention is directed to a method of providing power to a load. The method includes receiving input power at a line connection and a neutral connection from a first voltage source, rectifying the input power to produce a first rectified voltage at a first node during a positive portion of an input voltage wave and a second rectified voltage at a second node during a negative portion of the input voltage wave, in a line mode of operation, using a boost circuit to produce a positive DC voltage with respect to the neutral connection from the first rectified voltage and a negative DC voltage with respect to the neutral connection from the second rectified voltage, detecting loss of input power, and in response, decoupling the first node and the second node from the line connection and the neutral connection, coupling the first node to a positive connection of a backup power source and coupling the second node to a negative connection of the backup power source, and decoupling a midpoint of the boost circuit from the neutral connection, and coupling the midpoint of the boost circuit to the positive connection.

In the method, the backup power source may be a battery, and the method may further include producing the positive DC voltage and the negative DC voltage from a voltage of the battery in a backup mode of operation. The method may further include producing an output AC voltage from the positive DC voltage and the negative DC voltage in both the line mode of operation and the backup mode of operation. The boost circuit may include a first boost transistor having a first end and a second end, and a second boost transistor having a first end and a second end, with the second end of the first boost transistor coupled to the midpoint of the boost circuit, and the method may further include coupling the second end of the first boost transistor to the first end of the second boost transistor in line mode of operation. The method may further include after detecting loss of input power, decoupling the second end of the first boost transistor from the first end of the second boost transistor. The method may further include in the backup mode of operation, periodically switching the second boost transistor on and off and before each on and off transition of the second boost transistor, coupling the second end of the second boost transistor to the negative connection.

Another aspect of the invention is directed to an uninterruptible power supply that includes a first input having an input line connection and an input neutral connection to receive a first input voltage from a first voltage source, a second input having a positive input connection and a negative input connection to receive a second input voltage from a second voltage source, a boost circuit configured to provide a positive output DC voltage with respect to the input neutral connection and a negative output DC voltage with respect to the input neutral connection in both a line mode of operation and a backup mode of operation, and means for coupling the first input to the boost circuit in the line mode of operation, for coupling the second input to the boost circuit in the backup mode of operation for coupling a midpoint of the boost circuit to the input neutral connection in the line mode of operation, and for coupling the midpoint of the boost circuit to the positive input connection in battery mode of operation.

In the uninterruptible power supply, the second voltage source may be a battery having a positive terminal and a negative terminal, and the uninterruptible power supply may include the battery. The uninterruptible power supply may further include an output circuit coupled to the boost circuit to receive the positive output DC voltage and the negative output DC voltage and to provide an output AC voltage at an output having an output line connection and an output neutral connection. The uninterruptible power supply may be configured to provide an uninterrupted connection from the input neutral connection to the output neutral connection. The means for coupling may include a first transistor configured in a buck/boost circuit in a backup mode of operation and controlled to periodically turn on and off, and the uninterruptible power supply may further include means for coupling one end of the first transistor to the negative terminal before each on and off transition of the first transistor.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, prior approaches have provided for the use of a single battery in a split DC bus UPS. While the prior approaches can be effective in uninterruptible power supplies, at least one embodiment described below provides improvements over these prior approaches.

Figure 3A:
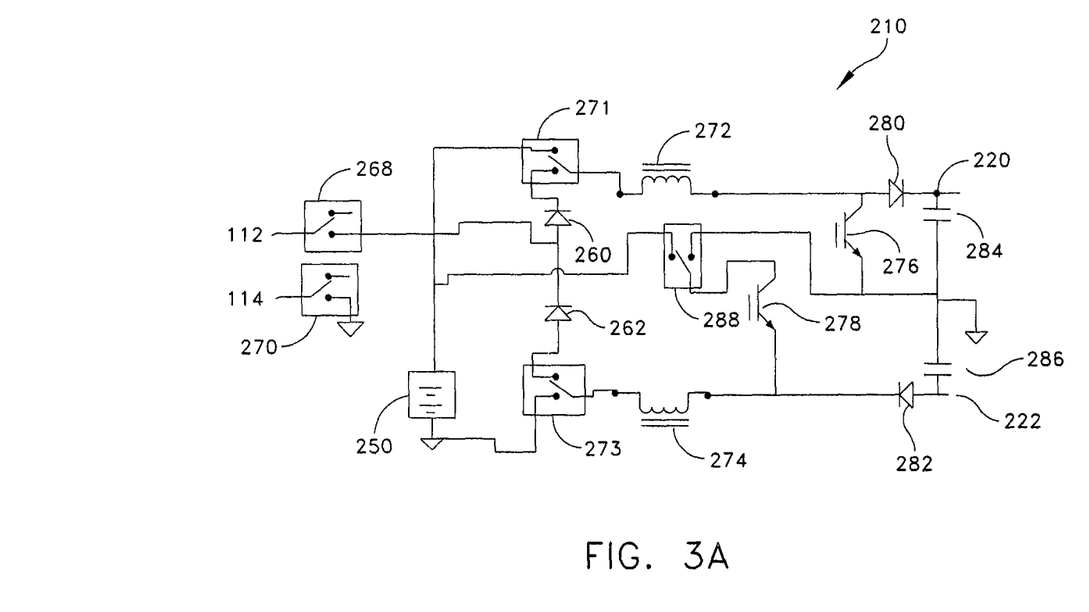
FIG. 3A is a schematic diagram of a rectifier/boost circuit in accordance with one embodiment of the invention.

FIG. 3A shows a schematic diagram of a rectifier/boost circuit 210 that can be used to replace the rectifier/boost circuit 110 in the UPS 100 in accordance with one embodiment. The rectifier/boost converter 210 includes input diodes 260, 262, relays 268 and 270, relays 271 and 273, inductors 272 and 274, boost transistors 276 and 278, output diodes 280, 282, output capacitors 284 and 286, and relay 288. The schematic diagram also shows a backup battery 250, and the rectifier/boost circuit 210 may include current and voltage sensing circuits to detect operational characteristics of the rectifier/boost circuit to assist in control of the circuit by a controller, such as controller 130 shown in FIG. 1.

In the rectifier/boost circuit 210 of FIG. 3A, the use of relay 288 enables the same transistor 278 to be used in both line and battery modes of operation to generate the negative voltage at output 222. The relay 288 selectively couples transistor 278 to one of the neutral line and the positive side of the battery depending on the mode of operation of a UPS containing the rectifier/boost circuit 210.

In line mode of operation, the relays 268, 270, 271 and 273 are configured to couple the AC line voltage from an AC voltage source to the boost inductors 272 and 274 through diodes 260 and 262, such that positive and negative rectified voltages are respectively provided to inductors 272 and 274. Relay 288 is configured to couple transistor 278 to the neutral point of the circuit. During periods of positive AC voltage of an input AC voltage source, inductor 272 operates in conjunction with transistor 276 and diode 280 as a positive boost circuit under the control of a controller, such as controller 130, using pulse width modulation to provide a positive DC voltage at the positive DC bus 220 across capacitor 284. Similarly, inductor 274 operates in conjunction with transistor 278 and diode 282 as a negative boost circuit under the control of the controller using pulse width modulation to provide a negative DC voltage at the negative DC bus 222 across capacitor 286.

Figure 3B:
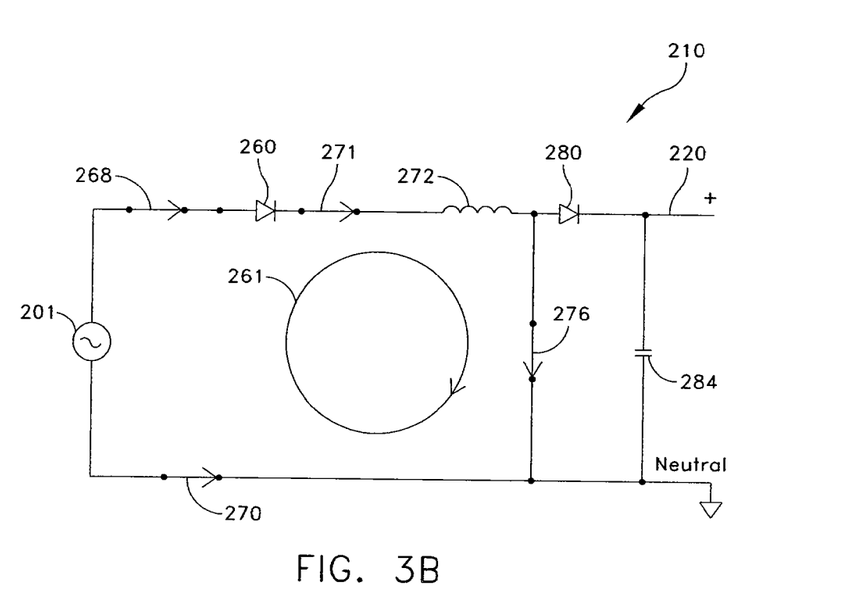
FIGS. 3B-3I are schematic diagrams indicating current paths in different modes of operation of the rectifier/boost circuit of FIG. 3A.
Figure 3C:
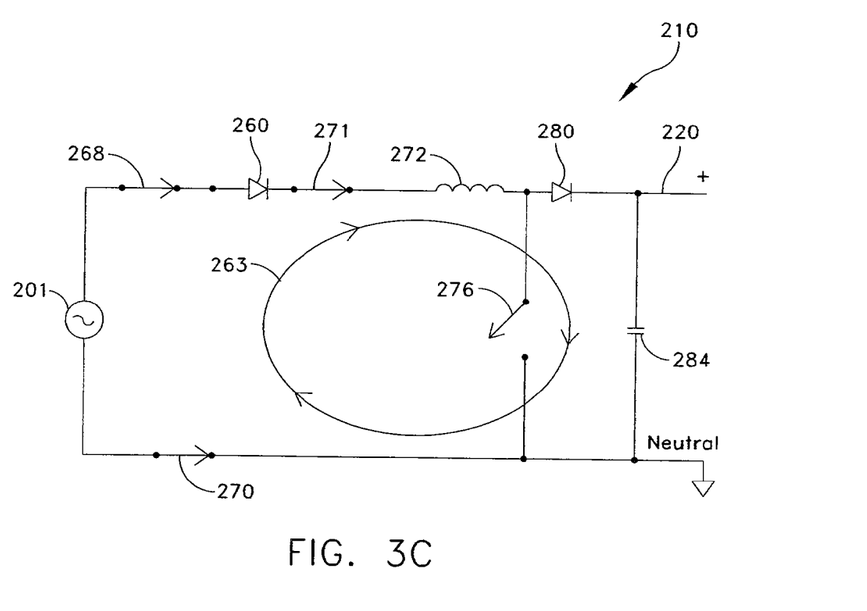

Operation in line mode will be further described with reference to FIGS. 3B-3E. FIGS. 3B and 3C show an equivalent circuit for the rectifier/boost circuit 210 in line mode of operation, during the positive half cycle of the input voltage waveform from an AC source 201. As shown in FIG. 3B, transistor 276 is first closed to create a current path 261 from the AC source through diode 260, inductor 272, and transistor 276. Then, as shown in FIG. 3C, transistor 276 is opened, and capacitor 284 is charged through a current path 263 that includes the AC source, diode 260, inductor 272, diode 280 and capacitor 284. As understood by those skilled in the art, during the positive half cycle, operation of the circuit 210 alternates between the modes shown in FIGS. 3B and 3C to maintain the voltage across capacitor 284 at a predetermined level.

Figure 3D:
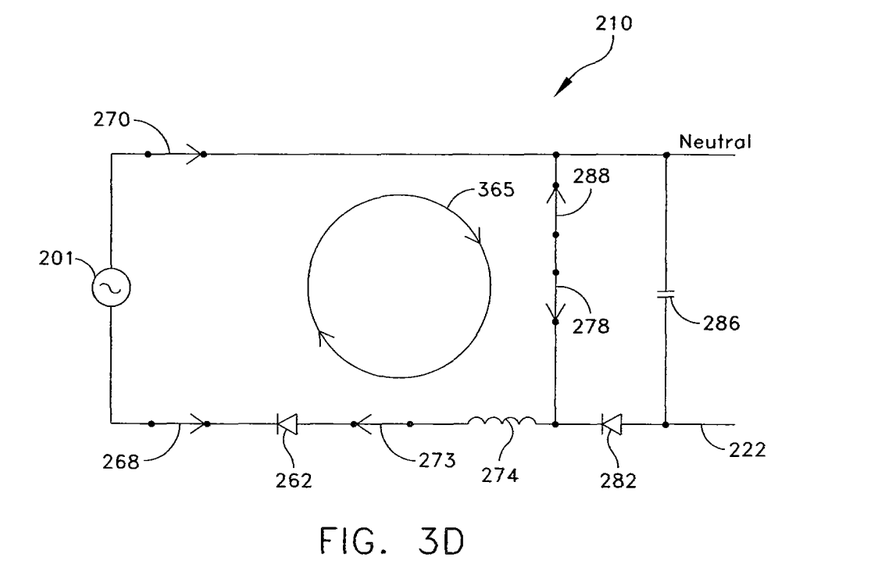
Figure 3E:
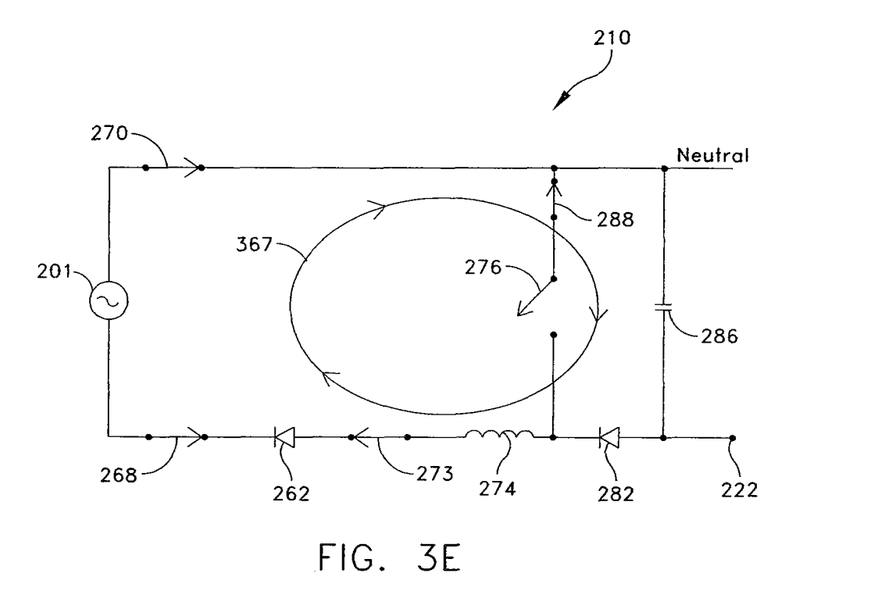

Similarly, FIGS. 3D and 3E show current paths 365 and 367 in line mode of operation during negative half cycles of the input AC voltage. First, as shown in FIG. 3D, transistor 278 is closed to create a current path 365 from the AC source through transistor 278, inductor 274 and diode 262, and next, as shown in FIG. 3E, transistor 278 is opened and the current follows a path 367 through capacitor 286, diode 282, inductor 274 and diode 262.

The rectifier/boost circuit 210 switches from line mode of operation to battery mode of operation when an out of tolerance condition (such as loss of power) of the AC voltage source occurs, and relays 268 and 270 are switched under control of the controller from the closed position to the open position. Also, in switching from line mode to battery mode, relay 271 is switched to couple the positive side of the battery to inductor 272, relay 273 is switched to couple the negative side of the battery to inductor 274, and relay 288 is switched to couple transistor 278 to the positive side of the battery. In battery mode of operation, the control of the positive and negative boost converter circuits is changed to a mode that allows power to be drawn from the battery to create the positive and negative bus voltages.

Figure 3F:
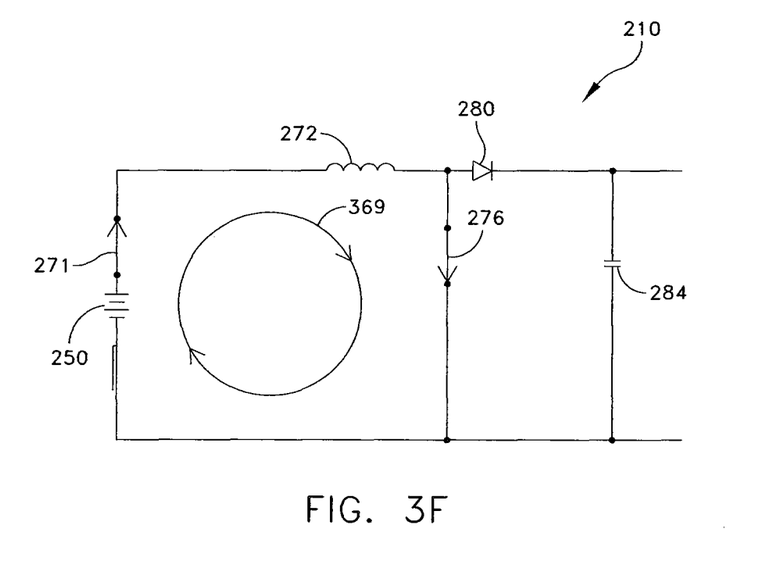
Figure 3G:
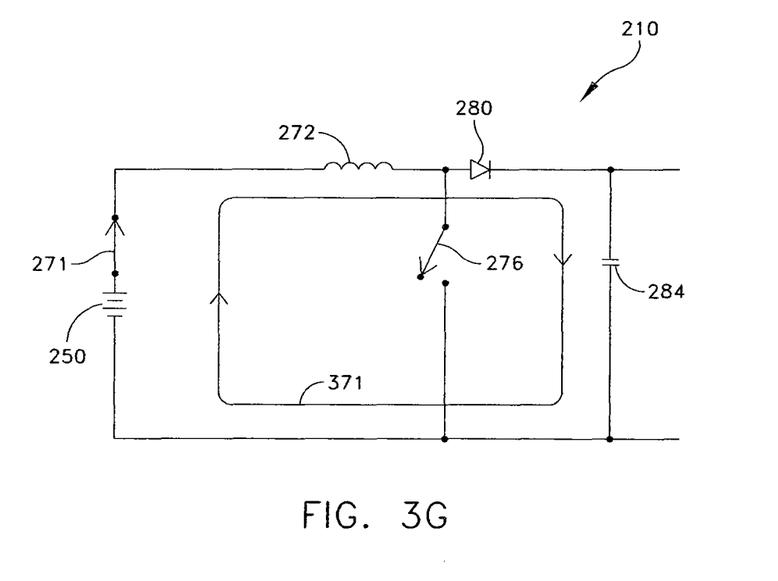

In one embodiment, in which the rectifier/boost circuit is used in a UPS having an output inverter like that described above with reference to FIG. 1, the draw of power from the battery in battery mode is synchronized with the output AC voltage waveform from the inverter, such that for the positive portion of the output AC waveform, the positive boost converter circuit is used to develop voltage across capacitor 284, and for the negative portion of the output AC waveform, the negative boost converter circuit is used to develop voltage across capacitor 286. More specifically, during the positive portion of the output waveform, a pulse width modulated control signal is applied to transistor 276 to generate the positive bus DC voltage across capacitor 284. FIGS. 3F and 3G show equivalent circuits with current paths 369 and 371 during battery mode of operation for the positive portion of the output waveform. First, as shown in FIG. 3F, transistor 276 is closed creating a current path 369 from the battery through relay 271, inductor 272, transistor 276, and through the neutral connection to the negative terminal of the battery. Next, as shown in FIG. 3F, transistor 276 is opened and current takes a path from the battery through relay 271, inductor 272, diode 26, capacitor 284 and through the neutral connection to the negative terminal of the battery.

Figure 3H:
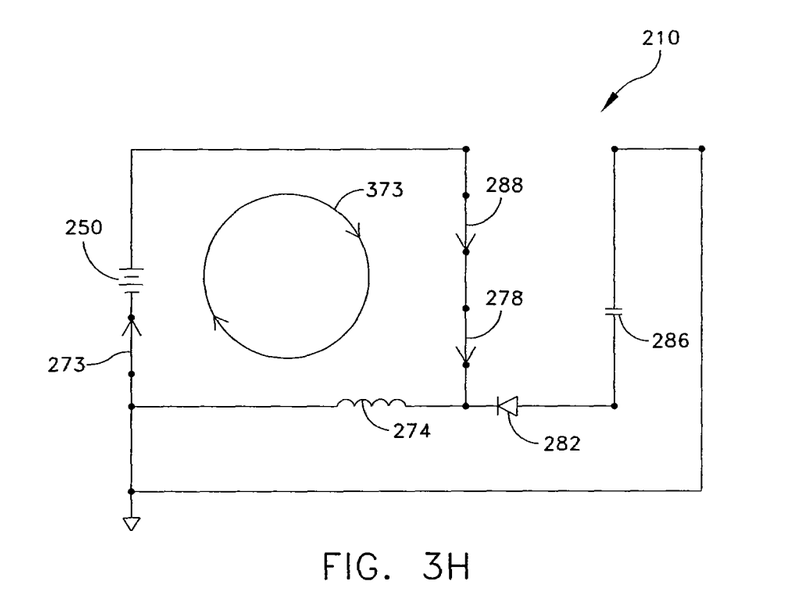
Figure 3I:
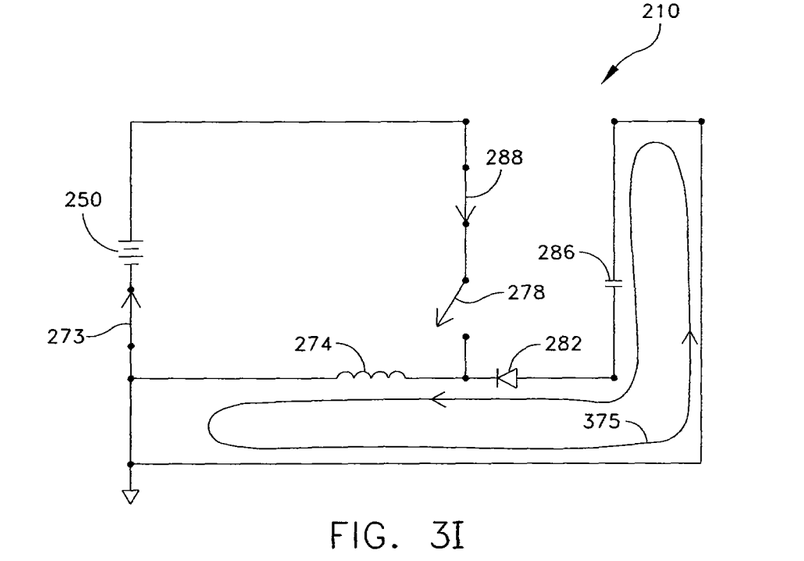

In a similar manner, during the negative portion of the output waveform, a buck/boost converter uses a pulse width modulated control signal applied to transistor 278 to generate the negative DC voltage across capacitor 286. FIGS. 3H and 3I show equivalent circuits with current paths 373 and 375 during battery mode of operation for the negative portion of the output waveform. First, as shown in FIG. 3H, transistor 278 is closed creating a current path 373 from the battery through transistor 278, inductor 274 and relay 273. Next, as shown in FIG. 3I, transistor 278 is opened and the inductor 274 is discharged by current taking a path 371 from the inductor 274 through capacitor 286, and diode 282.

The rectifier/boost circuit provides benefits over prior systems, like that shown in FIG. 2A by providing similar performance with a reduction in the number of transistors used in the circuit.

Figure 4:
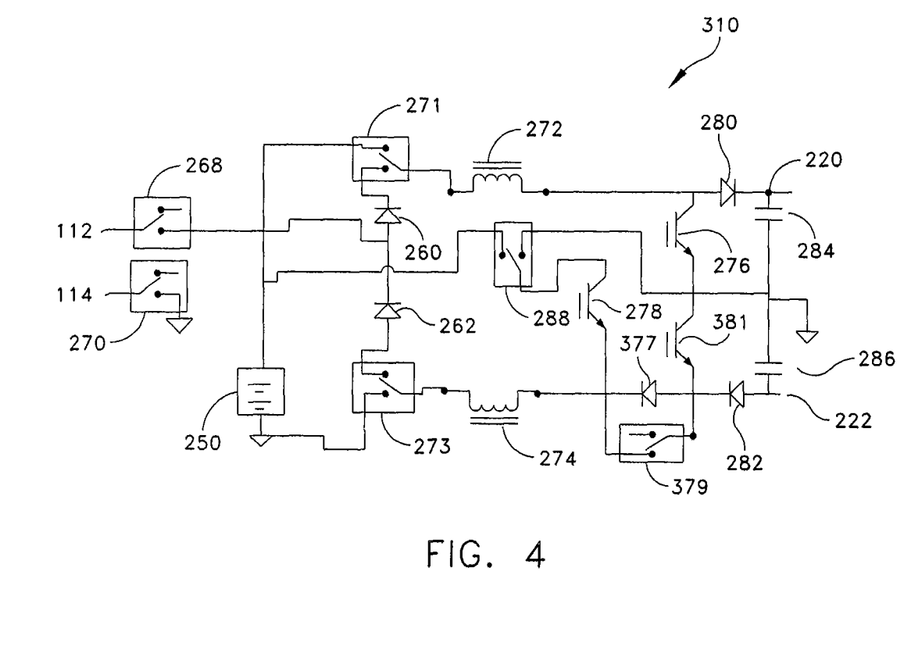
FIG. 4 is a schematic diagram of a rectifier/boost circuit in accordance with another embodiment of the invention.

Another embodiment of a rectifier/boost circuit 310 that may be used to replace rectifier boost circuit 110 will now be described with reference to FIG. 4. The rectifier/boost circuit 310 is similar to rectifier/boost circuit 210, and like parts are identified using the same reference numerals. The rectifier/boost circuit 310 differs from rectifier boost circuit 210, in that rectifier/boost circuit 310 includes three additional components, transistor 381, diode 377 and relay 379, that may be used to lower losses of the circuit when operating in battery mode of operation.

The rectifier/boost circuit 310 operates in a manner similar to that of rectifier/boost circuit 210 in line mode of operation with transistor 276 being controlled using a pulse width modulated signal during the positive portion of the input waveform to charge capacitor 284 and with transistor 278 being controlled using a pulse width modulated signal during the negative portion of the input waveform charge capacitor 286. In line mode of operation, relays 268 and 270 are respectively coupled to diodes 260 and 262, relay 288 is coupled to the neutral bus, and relay 379 is configured to bypass diode 377. Transistor 381 remains off during line mode of operation.

The rectifier/boost circuit 310 also operates in a manner similar to that of rectifier/boost circuit 210 in battery mode of operation with improved performance during the charging of capacitor 286. In battery mode, rectifier boost circuit 310 controls transistor 276 using a pulse width modulated signal during the positive portion of the output waveform and controls transistor 278 using a pulse width modulated signal during the negative portion of the output waveform. In battery mode of operation, relays 271 and 273 are respectively coupled to the positive and negative terminals of the battery 250, relay 288 is coupled to the positive terminal of the battery, and relay 379 is in an open position to bring diode 377 into the circuit. The rectifier/boost circuit 310 operates in the same manner as rectifier/boost circuit 210 in charging capacitor 284.

In charging capacitor 286, transistor 278, inductor 274 and diode 282 of boost/rectifier circuit 310 operate as a buck/boost converter in the same manner as described above for boost rectifier circuit 210. The additional components, transistor 381, diode 377 and relay 379, in rectifier/boost circuit 310, are used in battery mode to reduce switching losses of transistor 278. More specifically, to reduce switching losses in transistor 278, transistor 381 is turned on momentarily during battery mode of operation each time before turning transistor 278 on and off. Turning on transistor 381 in this manner brings the emitter of transistor 278 to the negative battery potential thus reducing the switching loss of transistor 278. Since transistor 381 is turned on only momentarily during battery mode of operation, the current rating of transistor 381 can be significantly less than the current rating of transistor 178 in the circuit of FIG. 2A and can be less than that of transistor 278. In one embodiment, in which a 25 kHz switching frequency is used for transistor 278, transistor 381 is turned on for a period of five microseconds before turning transistor 278 on, and transistor 381 is turned on for a period of five microseconds before turning transistor 278 off.

In comparison with at least some prior solutions, in at least one embodiment of the present invention, losses are reduced as there are no diodes disposed between boost transistors and the neutral of the power supply.

At least some embodiments described above provide more cost effective solutions by providing rectifier/boost circuits having reduced parts count and/or by enabling the use of transistors having lower current ratings.

In embodiments described above, a battery is used as a backup power source. In other embodiments, other AC or DC backup sources and devices may be used including solar powered devices, fuel cells, capacitors, a secondary AC power source, or any other power sources.

In embodiments described above, rectifier/boost circuits are described for use with uninterruptible power supplies. In other embodiments, the rectifier/boost circuits may be used with other power supplies and electronic devices.

In embodiments described above, output voltages are described as being provided at output DC busses. As readily understood by those skilled in the art, the terms bus, busses and voltage rails are not limited to particular types of conductors or wires to provide output voltages and may include any one of a number of devices or components.

At least some embodiments of the invention may be used with uninterruptible power sources having a variety of input and output voltages and may be used in single phase or multiphase uninterruptible power supplies.

In embodiments of the invention that utilize a battery as a backup power source, the battery may be comprised of multiple batteries of cells coupled in parallel or in series.

In at least some embodiments described above, in battery mode of operation, the charging of capacitors 284 and 286 is synchronized with the output AC voltage waveform of the UPS. In other embodiments, operation of the boost and the buck-boost converters to charge capacitors 284 and 286 are not synchronous with the output AC voltage, and the converters can be operated independently.

In embodiments described above, components including diodes, relays and transistors are described as performing functions in rectifier boost circuits. In other embodiments, other switching devices, including other types of transistors, may be used to perform functions described herein.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply comprising:
   a first input having an input line connection and an input neutral connection to receive a first input voltage from a first voltage source;
   a second input having a positive input connection and a negative input connection to receive a second input voltage from a second voltage source;
   a boost circuit configured to provide a positive output DC voltage with respect to the input neutral connection and a negative output DC voltage with respect to the input neutral connection in both a line mode of operation and a backup mode of operation, the boost circuit including a first switching device having a first end and a second end with the second end coupled to the negative input connection and the boost circuit including a second switching device having a first end and a second end;
   a first connection circuit configured to couple the first input to the boost circuit in the line mode of operation, and configured to couple the second input to the boost circuit in the backup mode of operation; and
   a second connection circuit configured to couple the first end of the second switching device to the input neutral connection in the line mode of operation and to couple the first end of the second switching device to the positive input connection in battery mode of operation.

2. The uninterruptible power supply of claim 1, wherein the second voltage source is a battery, and wherein the uninterruptible power supply includes the battery.

3. The uninterruptible power supply of claim 2, further comprising an output circuit coupled to the boost circuit to receive the positive output DC voltage and the negative output DC voltage and to provide an output AC voltage at an output having an output line connection and an output neutral connection.

4. The uninterruptible power supply of claim 3, wherein the uninterruptible power supply is configured to provide an uninterrupted connection from the input neutral connection to the output neutral connection.

5. The uninterruptible power supply of claim 1, wherein the first connection circuit includes a first relay configured to selectively couple one end of a first boost inductor to one of the input line connection and the positive input connection, and the first connection circuit includes a second relay configured to couple one end of a second boost inductor to one of the input line connection and the negative input connection.

6. The uninterruptible power supply of claim 1, further comprising a switching circuit configured to selectively couple the second end of the second switching device to the negative input connection.

7. The uninterruptible power supply of claim 6, wherein the second switching device is controlled in the backup mode of operation to periodically turn on and off and before each on and off transition of the second switching device, the switching circuit is configured to couple the second end of the second switching device to the negative input connection.

8. The uninterruptible power supply of claim 7, wherein the second switching device includes a first transistor having a maximum current rating, and the switching circuit includes a second transistor having a maximum current rating that is less than the maximum current rating of the first transistor.

9. A method of providing power to a load, the method comprising:
receiving input power at a line connection and a neutral connection from a first voltage source;
rectifying the input power to produce a first rectified voltage at a first node during a positive portion of an input voltage wave and a second rectified voltage at a second node during a negative portion of the input voltage wave;
in a line mode of operation, using a boost circuit to produce a positive DC voltage with respect to the neutral connection from the first rectified voltage and a negative DC voltage with respect to the neutral connection from the second rectified voltage, wherein the boost circuit includes a first boost transistor having a first end and a second end, and a second boost transistor having a first end and a second end, with the second end of the first boost transistor coupled to the neutral connection;
detecting loss of input power, and in response, decoupling the first node and the second node from the line connection and the neutral connection, coupling the first node to a positive connection of a backup power source and coupling the second node to a negative connection of the backup power source, and coupling the first end of the second boost transistor to the positive connection.

10. The method of claim 9, wherein the backup power source is a battery, and wherein the method further comprises:
producing the positive DC voltage and the negative DC voltage from a voltage of the battery in a backup mode of operation.

11. The method of claim 10, further comprising producing an output AC voltage from the positive DC voltage and the negative DC voltage in both the line mode of operation and the backup mode of operation.

12. The method of claim 9, wherein the method further includes coupling the second end of the first boost transistor to the first end of the second boost transistor in line mode of operation.

13. The method of claim 12, further comprising:
after detecting loss of input power, decoupling the second end of the first boost transistor from the first end of the second boost transistor.

14. The method of claim 13, further comprising: in the backup mode of operation, periodically switching the second boost transistor on and off and before each on and off transition of the second boost transistor, coupling the second end of the second boost transistor to the negative connection.

15. An uninterruptible power supply comprising:
a first input having an input line connection and an input neutral connection to receive a first input voltage from a first voltage source;
a second input having a positive input connection and a negative input connection to receive a second input voltage from a second voltage source;
a boost circuit configured to provide a positive output DC voltage with respect to the input neutral connection and a negative output DC voltage with respect to the input neutral connection in both a line mode of operation and a backup mode of operation; and
means for coupling the first input to the boost circuit in the line mode of operation, for coupling the second input to the boost circuit in the backup mode of operation for coupling a a first boost transistor of the boost circuit to a second boost transistor in the line mode of operation, and for coupling the second boost transistor to the positive input connection in the backup mode of operation.

16. The uninterruptible power supply of claim 15, wherein the second voltage source is a battery having a positive terminal and a negative terminal, and wherein the uninterruptible power supply includes the battery.

17. The uninterruptible power supply of claim 16, further comprising an output circuit coupled to the boost circuit to receive the positive output DC voltage and the negative output DC voltage and to provide an output AC voltage at an output having an output line connection and an output neutral connection.

18. The uninterruptible power supply of claim 17, wherein the uninterruptible power supply is configured to provide an uninterrupted connection from the input neutral connection to the output neutral connection.

19. The uninterruptible power supply of claim 16, wherein the second boost transistor is configured in a buck/boost circuit in the backup mode of operation and controlled to periodically turn on and off, and wherein the uninterruptible power supply further includes means for coupling one end of the transistor to the negative terminal before each on and off transition of the first transistor.

* * * * *

UNITED STATES PATENT AND TRADEMARK OFFICE
CERTIFICATE OF CORRECTION

PATENT NO.        : 8,878,389 B2  
APPLICATION NO.   : 13/004513  
DATED             : November 4, 2014  
INVENTOR(S)       : Milind Dighrasker et al.

It is certified that error appears in the above-identified patent and that said Letters Patent is hereby corrected as shown below:

In the Specification

Column 6, line 37, delete "31" and insert --3I--.

In the Claims

Column 10, claim 15, line 27, delete "a a" and insert --a--.

Signed and Sealed this  
Seventeenth Day of February, 2015

Michelle K. Lee  
*Deputy Director of the United States Patent and Trademark Office*